United States Patent [19]

Caputi, Jr.

[11] 4,433,334
[45] Feb. 21, 1984

[54] PASSIVE RANGING SYSTEM
[75] Inventor: William J. Caputi, Jr., Centerport, N.Y.
[73] Assignee: Eaton Corporation, Cleveland, Ohio
[21] Appl. No.: 423,427
[22] Filed: Sep. 21, 1982
[51] Int. Cl.³ .............................................. G01S 3/02
[52] U.S. Cl. .................................... 343/450; 343/461
[58] Field of Search ......................... 343/112 R, 112 S
[56] References Cited
U.S. PATENT DOCUMENTS
3,953,856  4/1976  Hammack ...................... 343/112 D Primary Examiner—Theodore M. Blum
Attorney, Agent, or Firm—James A. Kane, Jr.

[57] ABSTRACT

Range and velocity of target vehicles are determined from the angles of arrival of strobes from the target vehicles to provide a completely passive, linear, ranging system. From inputs which include strobe angle, time of strobe and receiving vehicle cross range position, the targets vehicles ranges and velocities are determined. A visual presentation is provided to enhance detecting the target vehicle in a high density environment.

3 Claims, 13 Drawing Figures

PASSIVE RANGING SYSTEM

BACKGROUND

1. Field

The present invention relates to passive ranging systems and, more particularly, to such systems in which angular position information is the only data obtained from the target.

2. Prior Art

Radar surveillance aircraft are often faced with the problem of operating in a dense and moving environment. The radar displays aboard the surveillance aircraft are adversely affected by jamming sources, but may be restored by locating these jamming sources. It is preferable to accomplish the location of the jamming sources passively from the surveillance aircraft to reduce the probability of detection and to avoid the need for cooperating aircraft or ground stations in locating the jammers.

A number of triangulation techniques are available; however, surveillance aircraft generally do not provide sufficient distance between direction finding antennas to make use of these techniques.

A first prior art nontriangulation technique uses the fact that the intercepted power from a target vehicle is proportional to the inverse of the range squared. Hence, two surveillance aircraft carrying intercept receivers separated by a substantial distance along the line directed at the jammer will measure slightly different intercepted powers which may be used (environment permitting) to calculate range. However, the required separation in receivers does not permit this technique to be carried out with a single aircraft.

A second prior art technique uses the elevation angle of the intercept and an assumed value of the jammer altitude to calculate range. This technique, like the first, is very sensitive to propagation and equipment errors and is based on an altitude assumption which greatly reduces it reliability.

A third scheme is similar to the second, except that the jammer ground reflection is used to obtain an estimate of elevation angle. The time-difference or phase-difference-of-arrival of the direct and ground bounce intercepted signals is computed, and this information (converted to jammer elevation angle) together with the target altitude assumption, is used to calculate range. The continued use of the altitude assumption again makes this scheme unreliable.

A fourth technique is a further variant which uses the bistatic radar reflection off a nonradiating target caused by a cooperative or noncooperative ground surveillance radar. The time-difference-of-arrival between the direct surveillance radar intercept and the bistatic reflection from a target places the target on an ellipsoid of which the surveillance radar transmitter and the intercept receiver are foci. If the target-bearing angle can be determined using the intercept antenna, the target may then be located on a line which is the intersection of the bearing angle plane with the ellipsoid. If, further, the jammer altitude can be estimated, the intersection of the aforementioned line with the plane of constant altitude determines jammer position. Again an assumed altitude is used making this technique unreliable. In addition, a cooperating or noncooperating ground surveillance radar is required.

Two other techniques that apply to airborne emitters bear mentioning. The first is ground imaging of the area directly underneath the emitter by comparing the ground-reflected intercept energy with the directly-received intercepted energy which is used as a reference. The jammer position is then determined by comparing the image obtained from the intercept with aerial photographs or images obtained by other means. This requires appreciable time which is rarely, if ever, available in a combat situation.

Another technique is called PROSE, for Passive Ranging On Scanning Emitters. This technique is applicable to ranging on an enemy AWACS-like emission: that is, the emission from a scanning radar in place of the jammers or jammer-like sources considered above. In this case, the enemy radar scan rate can be measured rather accurately using the average interval between main lobe intercepts determined over a long time base. If then two intercept antennas are provided on the friendly surveillance aircraft, and the time delay between corresponding main beam intercepts on these two antennas is calculated rather accurately, the parallax angle, or angle of rotation of the enemy scanning radar, between the intercepts at the two antennas can be calculated. Then, knowing the distance between the two intercept antennas, the range to the enemy scanning radar from the friendly surveillance aircraft can be calculated. Although this approach is a parallax-like technique, it requires a large aperture for the scanning radar antenna and a long baseline, neither of which may be available.

A typical passive ranging scenario is shown in FIG. 7. As noted above, the traditional problem is to obtain the range of an unfriendly emitting target using angle of arrival information obtained via a directional receiver onboard a friendly vehicle. FIG. 7 shows a first flight path 701 of a jamming aircraft, a second flight path 702 of a surveillance aircraft, first, second and third segment of the surveillance flight path designated by drawing numeral 703, 704 and 705, respectively, a corresponding first, second and third segment of the jammer flight path designated by drawing numerals 709, 710 and 711, respectively, and strobes connecting the respective centers of the first, second and third segments of the two flight paths, designated by drawing numerals 706, 707 and 708. To aid in distinguishing the three different flight path segments and their respective strobes, a dotted line has been used for the first, a dashed line for the second and a solid line for the third.

Accordingly, in FIG. 7, three jammer bearing angles are shown: the first dotted, the second dashed, and the third in solid. The corresponding segments of the jammer and surveillance flight paths are shown in dotted, dashed and solid line coding. If the jammer had been fixed, the three strobes would intersect in a point when projected back from the known locations of the surveillance aircraft at the time the strobes were received. The back projection of the strobes would intersect at the estimated position of the fixed jammer. The case that is shown, however, is for a moving jammer. The conventional approach is based upon the assumption that the tangential component of jammer velocity is constant. When jammer tangential acceleration is much smaller than the radar tangential acceleration component (as when the surveillance aircraft is flown in an arc), and the time intervals are equal, range is estimated by locating the position in range (which is along the X-axis, 712 in this Figure) for which the strobes are equally spaced and correctly ordered in cross range (which is along the Y-axis 715 in this Figure). The effect of radial component of jammer motion is small, as it causes only a slight error in the estimated range of the jammer. This approach, however, depends strongly upon the identification of each strobe with a particular unique jammer.

In FIG. 8, a second jammer has been added. This jammer is moving on a path 801 in an opposite direction to the first 701 and is located at a different range from the surveillance aircraft. Again, the new jammer strobes are coded in accordance with the position of the radar and jammer at the time of the observation. Thus, the first strobe on each jammer is coded by dotted lines 706 and 806, the second by dashed lines 707 and 807, and the third by solid lines 708 and 808, as in the previous Figure.

This Figure shows that if the radar operator is unable to identify a particular jamming strobe with a particular jammer (as, for example, when both jammers are wide band noise of identical parameters), unique jammer ranging may not be possible. For example, if the wrong dashed strobe is assumed to be identified with the second jammer, its range would be incorrectly estimated as being about half-way between the two actual jammer positions.

The problem then is how to estimate jammer positions unambiguously without the need for identification of a particular strobe with a particular jammer.

An approach to the solution of the problem involves the use of a modified form of a technique that has been in use recently in the field of modern X-ray technology. This technique, called Computer Augmented Tomography (CAT) X-ray, has been well developed for mapping continuously distributed emitters or absorbers using angle measurements only. The CAT approach, unfortunately, works only with a fixed object (emitter or absorber). However, a review of this technique as it presently is applied to fixed objects is necessary to understand any modifications which would make it applicable to the solution. In order to do this, a review of least means (LMS) ranging will be presented first.

FIG. 9 shows a typical radar flight path 901 in dashed lines and three angle of arrival strobes 902, 903 and 904 in dotted lines that would be obtained on a single fixed jammer 907 (circle). LMS ranging defines one of the three strobes as a reference and calculates the perpendicular distance from the reference strobe to each of the other two at a particular value of range (X). As an example, the two short dotted lines 905 and 906 are the perpendicular distances that would be obtained for a value of X somewhat shorter than the true range of the jammer. In LMS ranging, the length of the two short dotted lines are squared and then summed, and X is varied until a minimum value is found for the sum. This condition would obviously be obtained when the test value of X was equal to the range of the jammer. In fact, even if the strobe positions were in error due to errors in the angle of arrival measuring system or in the supposedly known position of the surveillance aircraft at the time of the measurements, the LMS approach would give the optimum estimate of the range of a single jammer.

When a second jammer is added, however, unless the strobes can be kept separate—that is, identified uniquely with a particular jammer, LMS ranging would give a single jammer range estimate which is midway between the two jammers.

The example is shown in FIG. 10. The second jammer 1007 has angle of arrival strobes 1002, 1003 and 1004 in solid lines, and the perpendicular distances that correspond to the LMS estimate of range at the ends of the callout lines 1005 and 1006 formed of alternate dots and long dashes. This approach obviously does not work for multiple jammers.

CAT ranging, on the other hand, as it is applied to X-raying, may be immediately applied to fixed jammers. The technique works by generating for each jamming strobe a weighted back projection which is weighted most strongly (that is, brightest on a display system) at the measured angle of arrival of the jammer strobe and which fades in intensity corresponding to the potential accuracy of the angle of arrival information. As an example, if the angle of arrival sensing system is known to be accurate to about 5 degrees, the back projection would be weighted to have half intensity 5 degrees away from the measured angle of arrival of the received jammer signal.

Jammer positions would now be estimated by overlaying back projections corresponding to each of the three jammer strobe positions of the previous illustration.

FIG. 11 shows what would happen if the strobes were presented on a cathode-ray tube display with one jammer where the back projections were unweighted. Notice that the three strobes 1102, 1103 and 1104 on the display are brightest in the area designated by drawing numeral 1105 where the strobes overlay one another which is only at the estimated position of the jammer. These strobes are of equal, moderate intensity. Where they all cross, the intensities add, and a bright white area 1105 is produced. In order to simulate this effect, the strobes are shaded with the exception of the crossover area 1105. If the back projections had been weighted, an even better estimate of the position of the jammer would have been obtained. Of course, for a single jammer, LMS ranging could have been used to obtain a comparable estimate of jammer position.

However, when the second jammer is added, it can be seen from FIG. 12 that the jamming strobes 1102, 1103, 1104, 1202 and 1204 are automatically identified with the correct jammers. That is, 1102, 1103 and 1104 are associated with the jammer at 1105, and strobes 1103, 1202 and 1204 are associated with the jammer at 1205. The final display is brightest only at the positions of the two jammers 1105 and 1205. Other ambiguous positions that correspond to potential jammers form an image that is considerably less bright than the true position. Of course, the more back projections there are, the more accurate this technique is. In the original CAT X-ray technique, a continuous set of back projections from all aspect angles is used to generate an excellent image of a completely distributed object.

As noted, the use of the state of the art CAT X-ray technique provides a solution for stationary jammers, but unfortunately, in its present form fails to provide a solution for moving jammers, which a most common problem, encountered regularly with airborne jammers.

SUMMARY

It is an object of the present invention to provide a completely passive ranging system where the ranging system and the emitting target are on independent moving platforms.

It is an object of the present invention to provide a ranging system capable of determining the range to an emitting target as well as target velocity with angle of arrival of a jammer strobe being the only information obtained from the target.

It is an object of the present invention to provide a target ranging system capable of operating in a high density environment.

In a typical case, the system of the present invention accepts as inputs the angle of arrival of strobes of electromagnetic energy such as jammer strobes from a target aircraft and stores this information along with the time of arrival of the strobe and the cross range position of the surveillance aircraft.

The data from three or more consecutive strobes is used to compute three or more planes in which both the target and receiving aircraft are located at the time of the strobes. The intersection of these planes provides the range and velocity of the target aircraft. A specific embodiment for implementing this system is presented. This embodiment is capable of determining target range and velocity from received angle of arrival data only. In addition, the embodiment includes a visual presentation to enhance target identification through the use of operator interpretation, which is especially advantageous in high density environments.

DETAILED DESCRIPTION OF THE INVENTION

Figure 1A:
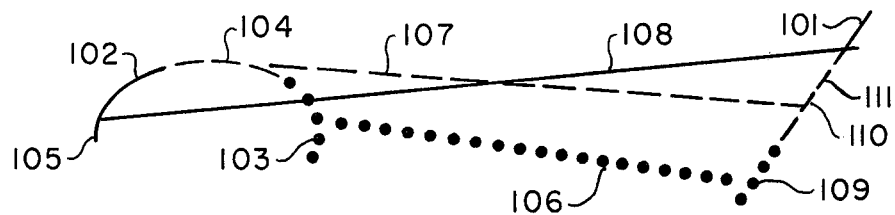
FIG. 1A is a diagram showing the flight path of a surveillance and a target vehicle.

The system technique of the present invention is used to solve the problem of locating moving targets when the surveillance vehicle is also in motion and only angle of arrival information is available. As a starting point, reference is made to the traditional approach used for a single moving jammer as illustrated in FIG. 1A. Note that this is only a two dimensional Figure. In order to describe the approach of the present invention, an additional dimension which corresponds to jammer velocity is required. Hence, below the first illustration shown in FIG. 1A, a perspective version is shown in FIG. 1B in which a Z axis dimension has been added to provide a means of representing velocity.

FIG. 1A shows a first flight path 101 of a target aircraft carrying an emitter such as a jammer, a second flight path 102 of an intercept or surveillance aircraft, first, second and third segment of the surveillance flight path designated by drawing numeral 103, 104 and 105, respectively, a corresponding first, second and third segment of the jammer flight path designated by drawing numerals 109, 110 and 111, respectively, and strobes connecting the respective centers of the first, second and third segments of the two flight paths, designated by drawing numerals 106, 107 and 108. To aid in distinguishing the three different flight path segments and their respective strobes, a dotted line has been used for the first, a dashed line for the second and a solid line for the third.

Figure 1B:
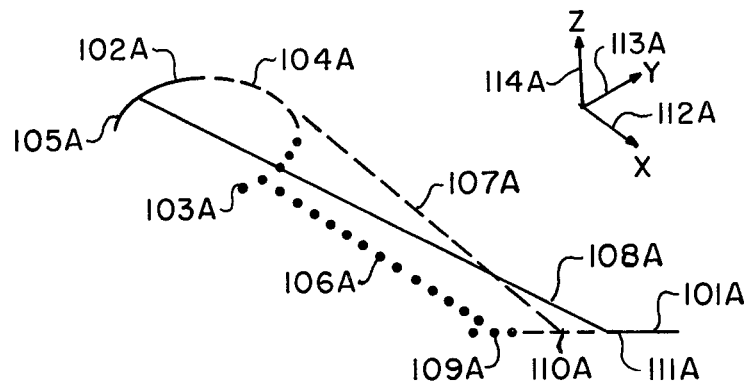
FIG. 1B is a perspective view of the paths of FIG. 1.

FIG. 1B illustrates two flight paths and their associated strobes which are similar to those shown in FIG. 1A. The elements in FIG. 1B that correspond to the elements in FIG. 1A are designated with identical drawing numerals, however, the letter "A" has been added to each drawing numeral in FIG. 1B to identify the Figure from which these elements originate. FIG. 1B also includes a coordinate axis in which the X, Y and Z axes are designated by drawing numerals 112A, 113A, and 114A, respectively.

In FIGS. 1A and 1B, the strobes represent the direction of arrival of a signal transmitted from the target aircraft during each segment of the flight paths. The target and surveillance aircrafts are considered as having passed through and completed each of the corresponding segments of the respective flight paths simultaneously. The flight paths shown in FIG. 1B are considered as lying in the X-Y plane. The Z direction in this Figure is reserved for a representation of tangential velocity of the target aircraft as will be apparent from the description of subsequent Figures.

Figure 2:
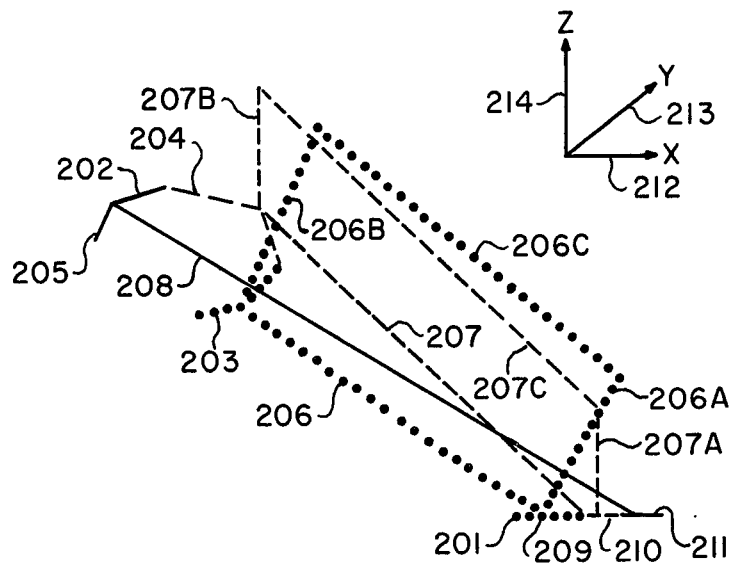
FIG. 2 is a first construction which presents vehicle velocity on the flight paths of FIG. 1B.

In order to determine the estimated range and velocity of the target aircraft, it is necessary to construct a three dimensional diagram, as shown in FIG. 2. In this Figure, the Z axis 214 or "up" direction is used to represent the tangential component of the emitting aircraft's velocity. The X axis and the Y axis are denoted by drawing numerals 212 and 213, respectively.

Beginning with the dashed strobe 207, a planar surface of arbitrary height is erected in the Z direction. Vertical lines 207A and 207B and parallel lines 207 and 207C define this surface. The time at which the position and velocity of the emitting aircraft is estimated is that at which the dashed strobe 207 occurred. In FIG. 2, this is approximately the time of the midpoint of the total flight paths and also corresponds to the midpoint of the dashed flight paths.

A tilted planar surface, which includes as one edge the dotted strobe 206, is erected next. This planar surface also includes edges 206A, B, and C and extends in the Z direction the same distance as the dashed plane. However, it is tilted in the Y direction 213 by an angle whose tangent is proportional to the time difference elapsed between the collection of the dotted data and the dashed data (dashed time minus dotted time).

Figure 3:
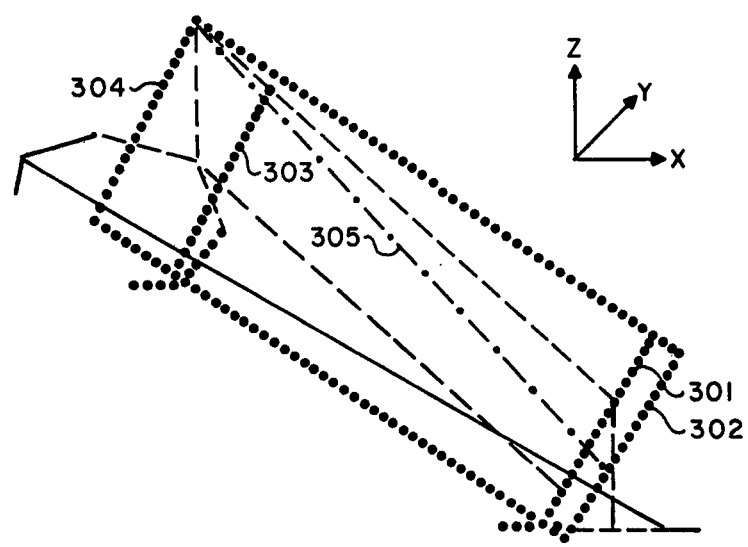
FIG. 3 is a second construction which presents vehicle velocity on the flight paths of FIG. 1B.

The construction is continued in FIG. 3. This Figure is virtually identical to FIG. 2, with the exception of the four lines designated by drawing numerals 301 through 305. All of the drawing numerals which were previously shown in FIG. 2 have been deleted in this Figure to avoid cluttering. In this construction, the intersection of the dotted plane with the dashed plane is now determined. This is done by extending the dotted plane in the X direction at its left and right edges. The left edge 303 of the dotted plane is moved back to the position indicated by line 304 where the X coordinate of the left edge of the dotted plane equals the X coordinate of the left edge of the dashed plane. Similarly the right edge 301 of the dotted plane is moved to the right to the position indicated by drawing numeral 302 where its X component equals the X component of the right edge of the dashed plane. Then the intersection of the left edge of the dotted plane with the left edge of the dashed plane corresponds to one point that is on a line which indicates the intersection of the two planes. The intersection of the right edges of these two planes is a second point on the intersection line designated by drawing numeral 305. For purposes of visual and source identification, line 305 is formed of alternate dots and dashes.

Figure 4:
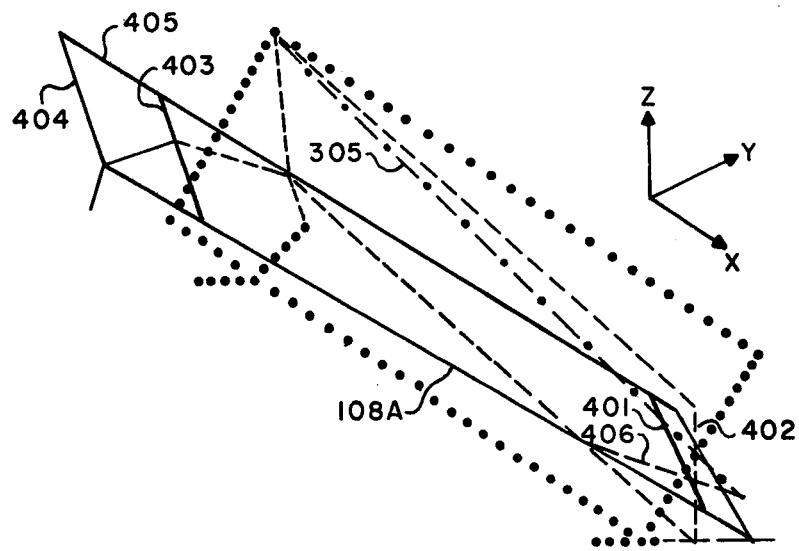
FIG. 4 is a third construction which presents vehicle velocity on the flight paths of FIG. 1B.

A similar construction is made for a solid line plane in FIG. 4. Right edge 402, top edge 405 and left edge 404 are added to solid line 108A to form the solid line plane. This plane is tilted at an angle whose tangent is proportional to the time elapsed between the collection of the solid data and the dashed data (solid time minus dashed time). The constant of proportionality is the same as was used in determinig the tilt angle of the dotted plane. The left and right edges 404 and 402 of the solid line plane are moved inward towards the center of the plane to form new edges 403 and 401 respectively which have the same X value as dashed edges 207B and 207A respectively.

The intersection of the dashed plane with the solid plane is indicated by line 406 which is formed of long dashes alternated with short dashes. Since line 305 lies in the dashed plane and line 406 lies in the same plane, these lines will intersect. This intersection is shown in FIG. 5.

Figure 5:
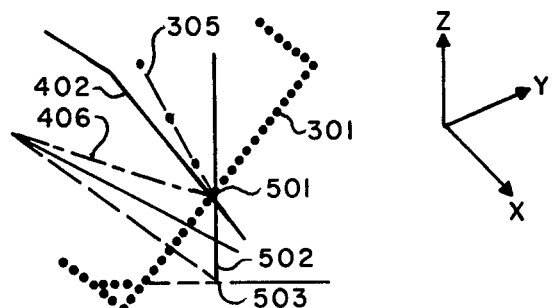
FIG. 5 is an expansion of a portion of the construction of FIG. 4.

FIG. 5 is an enlarged drawing of the right hand portion of FIG. 4 in which lines 305 and 406 have been extended to intersect at point 501. Point 501 is projected on the X-Y plane as point 503 by line 502. The height of line 502 is proportional to the velocity of the target at the reference time of interest. Point 503 represents the position of the target at the reference time of interest.

Figure 11:
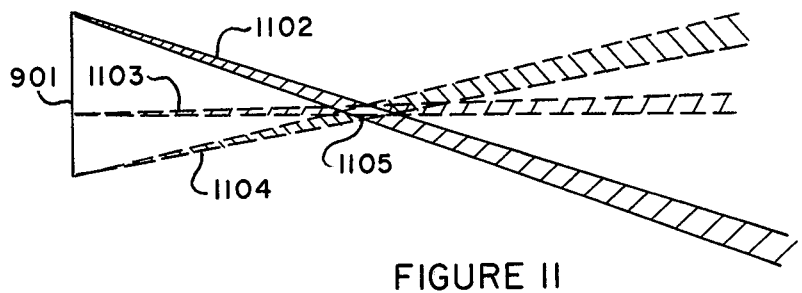
FIG. 11 is a cathode-ray tube representation of a flight path of a surveillance aircraft and a fixed target.
Figure 12:
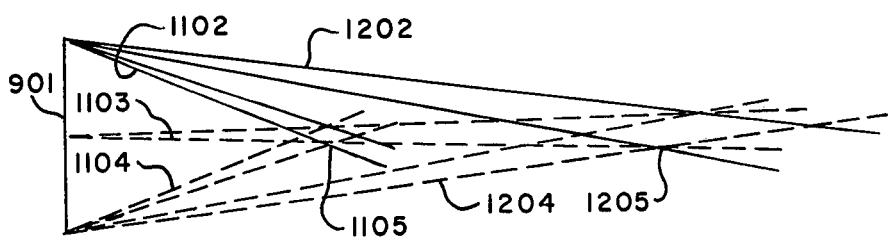
FIG. 12 is a cathode-ray tube representation of a flight path of a surveillance aircraft and two fixed targets.

If there are more than three observations, then all the planes may not intersect in one point due to angle measurement errors. To accommodate this potential error, each back projection plane is thickened into a wedge (such as the wedges shown in FIGS. 11 and 12) by an amount equal to the expected uncertainty of the angle of arrival information due to antenna errors or non-constancy of jammer motion. Then, each back projection wedge is assigned an intensity variation that is brightest at the central back projection plane, and diminishes towards the edges of the wedge. The most likely intersection point is found by summing the intensities of the back projection wedges.

It will be appreciated that this approach is a graphical method of searching for jammer tangential velocity. Furthermore, if there is more than one jammer, it can be seen that such a processor has the advantage of being completely linear—that is, superposition holds independent of the number of strobes or jammers. In addition, the jamming strobes are automatically associated with the correct jammers in a manner similar to that described for fixed target CAT ranging.

Figure 6:
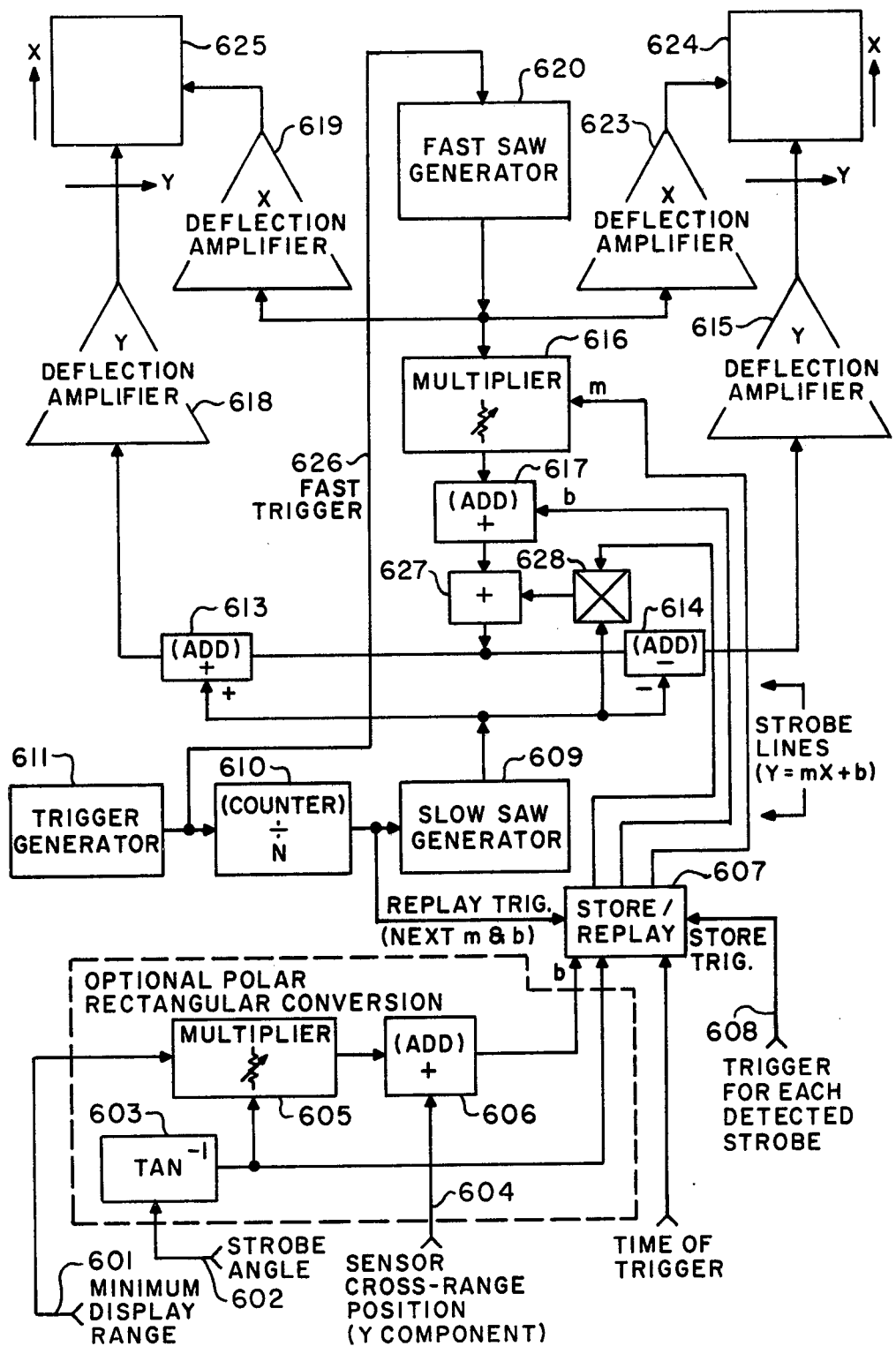
FIG. 6 is a block diagram of a specific embodiment of the present invention.
Figure 7:
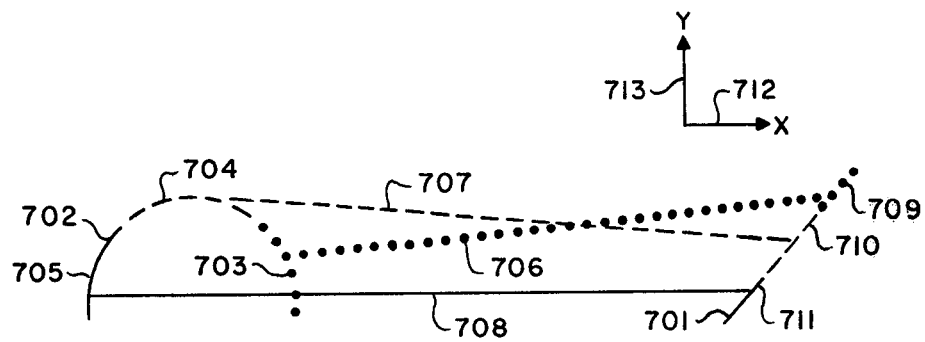
FIG. 7 is a diagram showing the flight paths of a surveillance and a target aircraft.
Figure 8:
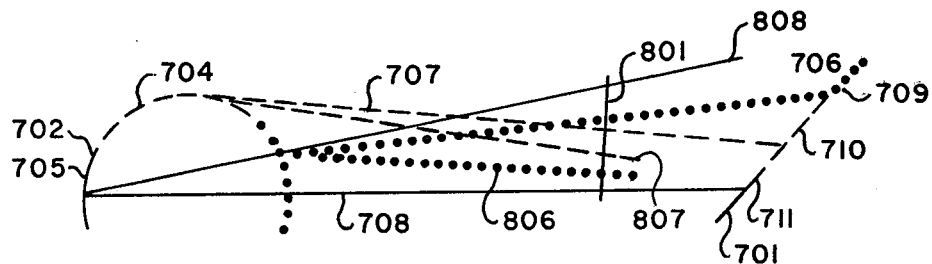
FIG. 8 is a diagram showing the flight paths of a surveillance aircraft and two targets.
Figure 9:
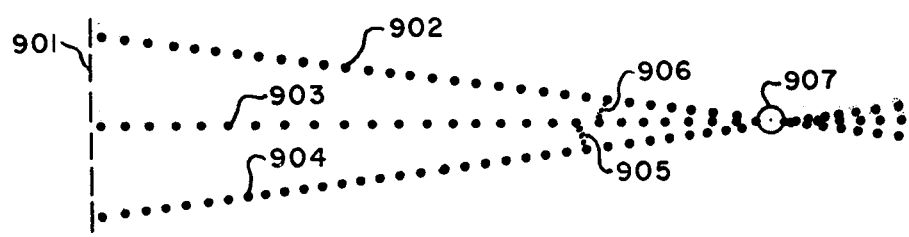
FIG. 9 is a diagram showing the flight path of a surveillance aircraft and a single fixed target.
Figure 10:
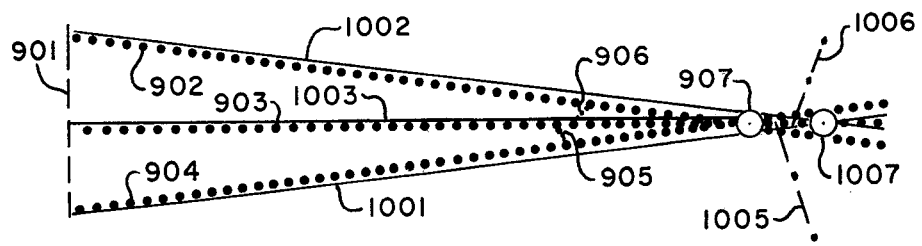
FIG. 10 is a diagram showing the flight path of a surveillance aircraft and two fixed targets.

A specific embodiment implementing this technique is illustrated in FIG. 6. In this embodiment, the three dimensional construction described previously, is implemented via a pair of cathode-ray tube display monitors deflected in an X-Y fashion. This pair of monitors is viewed stereoptically to create a visual impression of a three dimensional processing volume.

Inputs for the implementation are the angle of arrival strobes obtained by the surveillance receiver or other sensor. For the example of where a radar receiver aboard a surveillance aircraft receives externally generated jamming signals, each revolution of the surveillance radar antenna would result in a number of detected strobes and the angles of arrival of the strobes would be noted by the operator. Thus the strobe angle of arrival for each particular strobe and the surveillance aircraft position at the time the strobe is received are entered as primary inputs at the input port 604. In addition, if the display is to be offset from zero range (for example if the targets are expected to be at no closer range than say 100 miles), then the minimum display range is also entered as a constant in the minimum display input port 601. Furthermore, each time a strobe is detected and entered into the strobe inputs 608A and 608B of the Figure, a store trigger must be provided as for example manually by way of a push button so that the current data is stored and the inputs are made available for entry of the next strobe.

The strobe angle is assumed to be entered at input 602 in the form of a polar angle relative to north where north is used for reference purposes. An arc tangent function of this angle is obtained in function generator 603 for convenience in processing. The arc tangent slope is then multiplied in multiplier 605 by the minimum display range set as an input 601. If the minimum display range does not change significantly over the time required to process the data(perhaps a few minutes) then the multiplication can be performed most simply by using a potentiometer as shown in function generator 605. In this case, the slope is the electrical input to the potentiometer and the minimum display range is set by the operator by turning the control. The output of the potentiometer is then added in adder 606 to the instantaneous sensor cross range position also input by the operator. This results in the strobe line being defined by a slope (m) and an intercept (b); that is, in the form $Y = mX + b$.

Of course in modern surveillance radar systems navigation information is often already in rectangular form. Hence, the arc tangent function with its associated multiplier and adder is shown as an option. The strobe line position might easily be entered into the storage-replay unit 627 directly in the rectangular form of slope and intercept.

In any event, when these values are available for a particular strobe, the stored trigger from 608B causes the values to be recorded in memory in the store-replay unit 627. This may be done most conveniently in digital form, using a shift register, an A to D, and a D to A converter. The data quantity to be stored depends upon the number of strobes obtained per revolution of the radar antenna and the number of revolutions per data run. Typically, a dozen or so strobes per revolution might be expected and about 100 revolutions of the antenna are required to obtain sufficient data for accurate ranging. Thus, in the order of 1200 slope/intercept number-pairs must be stored over an interval of perhaps several minutes.

After data taking is completed, the data is replayed into a processor at a much higher rate than it was stored. In the processor, a replay trigger is provided by a trigger generator 611 operating at a high pulse repetition frequency (perhaps 10 MHz) and a divider 610 which divides the trigger frequency by a factor (N) equal to the number of resolvable velocity planes that it is desired to synthesize. The signal derived directly from the generator and that from divider are the fundamental signals forming the raster for the cathode-ray tubes 624 and 625 (through X and Y deflection amplifiers 623, 619 and 615, 618).

The fast trigger is used to initiate by way of line 626 a fast saw-tooth generator 620 which provides linear (with time) deflections of the two CRT tubes 624 and 625 in the X direction. After N deflections in the horizontal or X direction have been performed the replay trigger is also applied to a slow saw-tooth generator 609. Thus, during the fast saw-tooth repetition time interval, the output of the slow saw-tooth generator can be considered to be a slowly moving or even a constant voltage. The "constant" voltage is then proportional to the particular velocity being processed for each fast trigger. The purpose of this circuitry is to cause lines having the form $Y=mX+b$ to separate in the horizontal plane in order to give the operator the impression that the lines are moving away from the operator.

For the duration of the slow saw-tooth generator sweep (which includes many, (N), fast saw-tooth generator sweeps) only one of the previously stored strobe slope and intercept line value pairs will be presented at the output lines of the storage and replay unit. These constant slow saw-tooth voltages are applied to a multiplier 616 and an adder 617 to produce from the fast saw-tooth X-deflection signal, an attenuated and shifted fast saw-tooth Y-deflection signal. If this Y-deflection signal were applied without modification to the Y-deflection amplifiers, the result would be a single line on both the left and right monitor with a slope and intercept equal to the voltage values m and b respectively. These lines would of course be identical and when viewed stereoscopically would appear to be in the plane of the TV screen.

However, the output of the adder 617 is not applied directly to the Y deflection amplifiers but instead is offset by adding (for the left monitor in adder 613) or subtracting (for the right monitor in subtractor 614) the approximately constant voltage appearing at the output of the slow saw-tooth generator. Thus the sweeping of the slow saw-tooth generator causes the apparent third dimensional position of the strobe line to move off the phosphor plane of the CRT display. As long as the slow saw-tooth generator frequency (that is the replay trigger PRF 608B)is rapid compared with the response time of the eye, the resulting display will appear as a plane in three dimensional space as described in the previous discussion concerning the ranging constructions in FIGS. 1 through 5.

The next replay trigger calls up the next strobe slope and intercept values and the process is repeated for that strobe. This procedure is repeated until all of the strobes detected for all of the antenna revolutions of the radar system have been displayed.

Typically, the fast trigger would be generated at a 10 megacycle rate and in the order of 100 velocity planes would be synthesized. This would result in a replay trigger PRF in the order of 100 kilocycles (if N were equal to 100). If there are 1200 strobe lines stored in the storage replay device all data will then be replayed in 12 milliseconds. The process may then be repeated, replaying the same data repetitively at an 80 hertz rate (1/12 ms). This 80 hertz repetition frequency of the entire display results in a flicker-free three dimensional presentation of the entire data-set. The predicted target position and velocity appears brightest because the display monitors spend more time tracing through these positions than they do in tracing through other positions that do not contain targets.

Having described my invention, I claim:

1. Apparatus for determining the location and velocity of a target from the angle of strobes emitted by the target, the time of the strobes, and the cross-range position of the sensor at the time of each strobe, comprising:
   (a) a first cathode-ray tube,
   (b) a second cathode-ray tube,
   (c) a first Y deflection amplifier connected to the first cathode-ray tube to control the Y deflection of the first tube,
   (d) a second Y deflection amplifier connected to the second cathode-ray tube to control the Y deflection of second tube,
   (e) a first X deflection amplifier connected to the first cathode-ray tube to control the X deflection of the first tube,
   (f) a second X deflection amplifier connected to the second tube to control the X deflection of the second tube,
   (g) a store-replay unit means for accepting the following four input: a trigger to store each strobe, the arc tangent of the strobe angle, and a function equal to a minimum display range desired multiplied by the arc tangent of the strobe angle, all added to the sensor cross range position, and the time of the strobe said store replay unit means storing and processing such inputs as delineated in paragraph (1),
   (h) a trigger generator,
   (i) a fast saw-tooth generator, receiving as an input the trigger from the trigger generator to initiate each saw-tooth pulse, the output saw-tooth being supplied to the X deflection amplifiers to provide a sweep of the cathode-ray tubes,
   (j) a divide-by-N-counter receiving as an input the trigger from the trigger generator to produce a lower frequency trigger output at a frequency equal to the trigger generator frequency divided by N, the lower frequency trigger output being in synchronism with the trigger from the trigger generator,
   (k) a slow saw-tooth generator receiving the slow trigger output of the divide-by-N-counter to initiate each saw-tooth wave,
   (l) means for coupling the slow trigger output from the divide-by-N-counter to the store replay unit means to cause the store replay unit means to provide the following outputs: a time of strobe, the slope of the strobe line (m) and the intercept of the strobe line (b), derived from the minimum display range, the cross range position and the arc tangent of the strobe angle as delineated in paragraph (g),
   (m) a first multiplier receiving as inputs the output of the fast saw-tooth generator and the slope (m),
   (n) a first adder receiving as inputs the output of the first multiplier and the strobe intercept (b),
   (o) a second multiplier accepting as inputs the time from the store replay unit means and the output of the slow saw-tooth generator,
   (p) a second adder accepting as inputs the output of the first adder and the output of the second multiplier, (q) a third adder accepting as inputs the output of the second adder and the output of the slow saw-tooth generator, and supplying its output to the first Y-deflection amplifier for deflecting the first cathode-ray tube in the Y direction, (r) a first subtracter accepting as its first input the output of the second adder and as its second input the output of the slow saw-tooth generator, the second input being subtracted from the first in the subtracter to produce a difference output which is supplied to the second Y-deflection amplifier for deflecting the second cathode-ray tube in the Y direction, and (s) means for coupling the output from the fast saw-tooth generator to both the first and second X-deflection amplifiers to deflect the first and second cathode tubes in the X-direction.

2. A system for determining the location and velocity of a target by a sensor using the angle of strobes received from the target, the time of occurrence of the strobes and the cross range position of the sensor at the times of the strobes, comprising the steps of:

(a) presenting a representation of a first plane, said first plane encompassing the paths of the target and the sensor during the periods of the strobes, said first plane including all the strobes, (b) plotting a representation of the positions of the sensor at the time of each strobe in said first plane, (c) plotting a representation of a first series of lines in said first plane through the position of the sensor at the angle of the strobe received at each of the position of the sensor, said first series of lines being referred to as strobe lines, (d) selecting a representation of the position of the sensor and the target at midrange and designating them as the reference positions and their time of occurrence as the reference time, (e) erecting a representation of a second plane orthogonal to the first, said second plane including the strobe line passing through the reference position of the sensor, and said second plane being referred to as the reference plane, (f) erecting a representation of a first series of plane through selected positions of the sensor and the corresponding strobe lines received at these positions, the selected positions including those occurring prior to as well as after the occurrence of the reference position, each of the planes in this first series being tilted towards the reference plane at angles which are proportional to the time elapsed between the time of occurrence of the sensor position through which a plane in the first series passes and the time of occurrence of the sensor positions through which the reference plane passes, (g) generating a representation of a second series of lines which are formed by the intersections of the first series of planes with the reference plane, (h) drawing a representation of the point of intersection of the second series of lines, (i) generating a representation of a line orthogonal to the first plane which passed through the point of intersection of the second series of lines, (j) measuring the position of the point through which the orthogonal line of step (i) passes in the first plane to determine the location of the target at the reference time, and (k) measuring the length of the orthogonal line in subparagraph (i) to determine the velocity of the target at the reference time.

3. A system as described in claim 2, further comprising the steps of:

(a) expanding said first series of planes into wedges, the plane about which a wedge is formed being referred to as a central plane, the apex of a particular wedge being formed along a line passing through the selected positions of the sensors through which the particular central plane passes, (b) illuminating each wedge with varying intensity, wherein the brightest areas is the central plane about which a particular wedge is formed, the brightness of the wedge having a gradient towards less brightness in traversing the area orthogonally away from the central plane of the particular wedge and towards the edges of that wedge, (c) locating the brightest point at the intersection of the wedges produced from the first series of planes, (d) generating a representation of a line orthogonal to the first plane which passes through the point of step (c), and (e) measuring the position of the point through which the orthogonal line of step (c) passes to determine the location of the target at the reference time.

* * * * *